July 1, 1958  H. ERDMANN  2,840,892
APPARATUS FOR ASSEMBLING RETAINING RINGS
Filed June 25, 1956  2 Sheets-Sheet 1
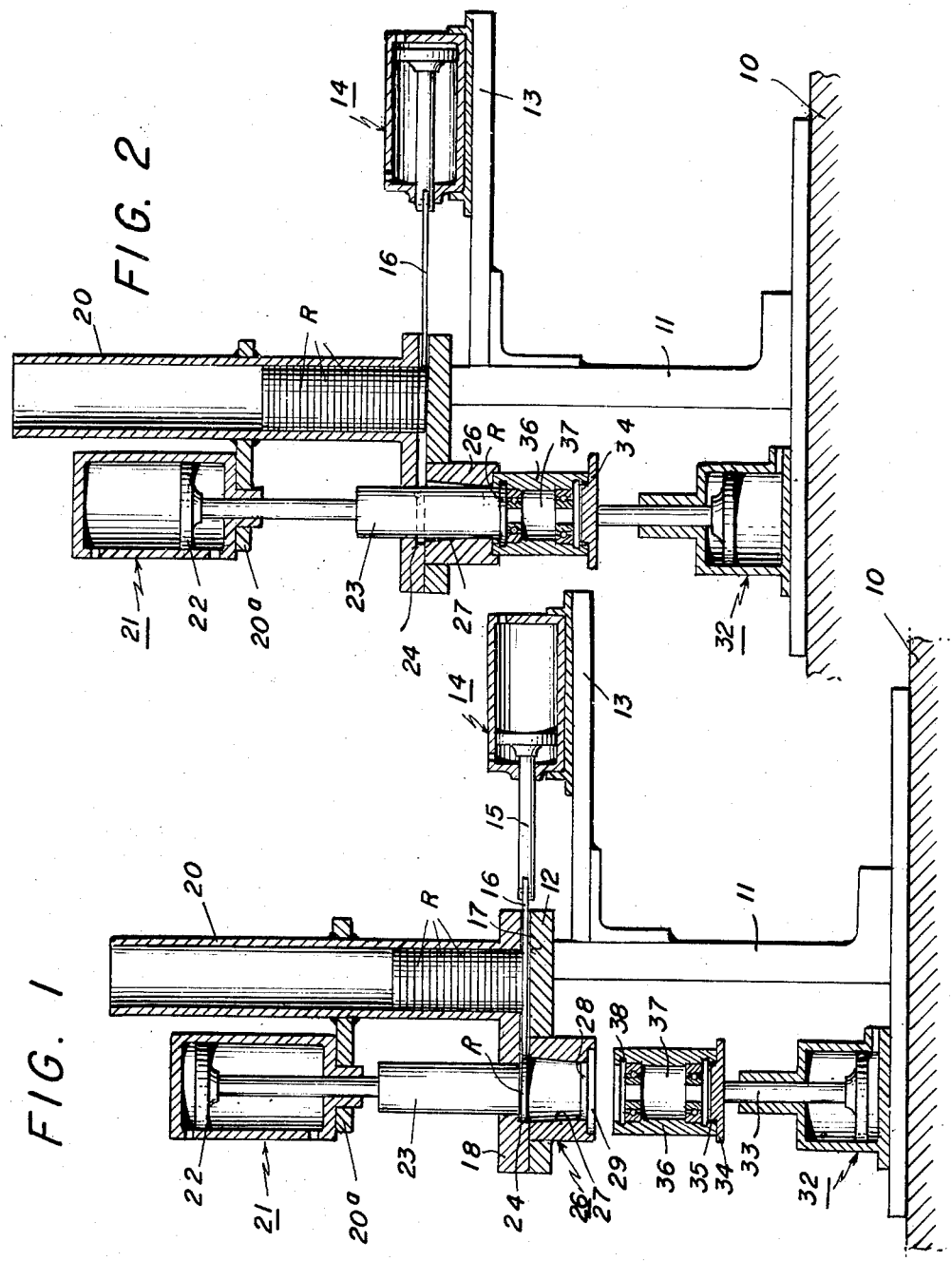
INVENTOR
HANS ERDMANN
BY
ATTORNEY July 1, 1958  H. ERDMANN  2,840,892
APPARATUS FOR ASSEMBLING RETAINING RINGS
Filed June 25, 1956  2 Sheets-Sheet 2
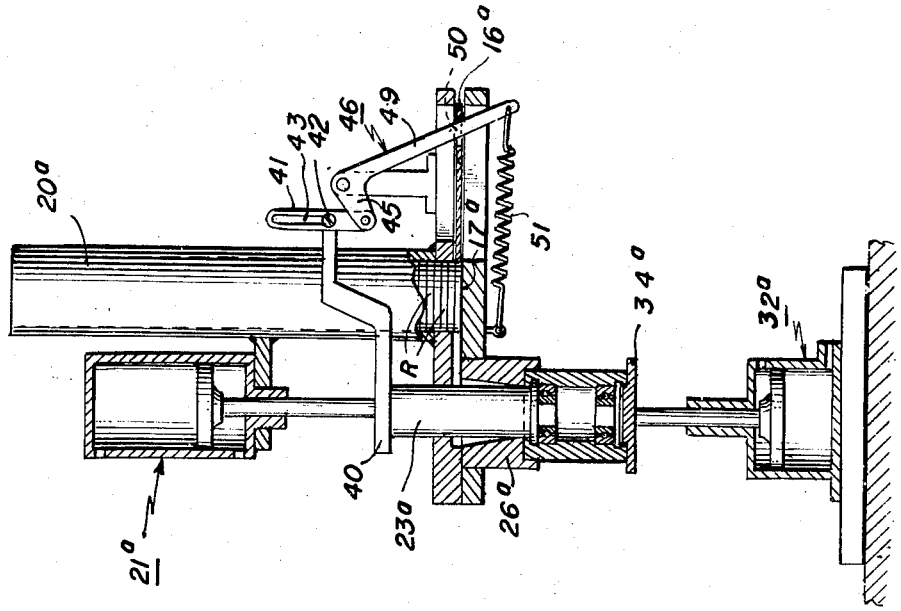
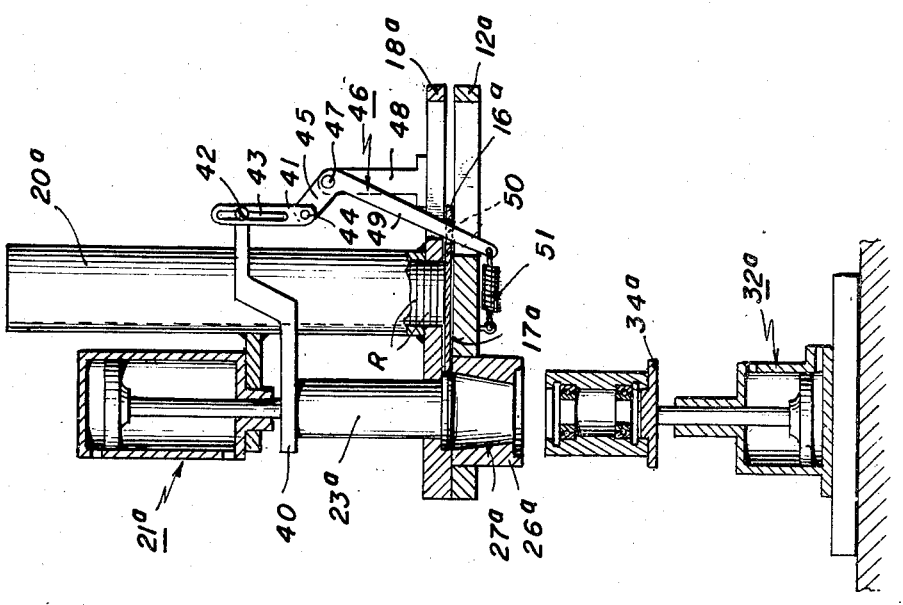
INVENTOR
HANS ERDMANN
BY
ATTORNEY United States Patent Office 2,840,892
Patented July 1, 1958

2,840,892

APPARATUS FOR ASSEMBLING RETAINING RINGS

Hans Erdmann, Maplewood, N. J., assignor to Waldes Kohinoor, Inc., Long Island City, N. Y., a corporation of New York Application June 25, 1956, Serial No. 593,679

6 Claims. (Cl. 29—211)

This invention relates to improvements in apparatus for assembling retaining rings, and more particularly to apparatus for assembling internal spring retaining rings in grooves provided therefor in housing bores in fully automatic manner.

As is well known, the assembly of internal spring retaining rings in their grooves requires that such a ring be contracted to a diameter somewhat less than that of the housing bore and thereupon moved into the bore to the plane of its groove, into which it springs when released. Despite the many objections thereto, plus the fact that manual ring assembly is not well suited to present day mass use of spring retaining rings, the assembly of internal spring retaining rings as aforesaid was heretofore performed manually through the use of hand-controlled pliers.

Stated broadly, an object of the invention is the provision of effective, practical apparatus for assembling internal spring retaining rings in grooves provided therefor in the bores of housings and the like requiring the use of internal rings in fully automatic manner.

More particularly, an object of the invention is the provision of simple yet fully effective and integrated apparatus for picking off or separating an internal retaining ring from a supply thereof, contracting it to a smaller diameter than that of the housing bore, and thereupon moving the contracted ring into said bore to the plane of the ring groove provided therein, in which the ring spring seats itself when reaching same, all in fully automatic manner.

Still another object of the invention is the provision of apparatus of the stated character which further incorporates means for properly and accurately positioning the housing or work piece for the reception of the contracted ring.

Yet a further object of the invention is the provision of automatically operating apparatus for assembling internal spring retaining rings in grooves provided therefor in the bores of housings and the like, which combines in effective and practical manner means for separating the lowermost internal ring from a stack or column thereof to be assembled and for feeding it to the larger-diameter end of a tapered ring-contracting sleeve bore, means for moving the ring through the sleeve thereby to effect its contraction, and means for moving a housing (work piece) into which the ring is to be assembled into axial alignment with the sleeve and to a coupled position with respect thereto, in which it in effect forms an axial continuation of said sleeve, whereby the work piece is enabled to receive the contracted ring as it is moved or pushed from the sleeve.

The above and other objects of internal retaining-ring assembly apparatus according to the invention will appear from the following detailed description thereof, in which reference is had to the accompanying drawings illustrating embodiments of such apparatus selected for purpose of simple disclosure, in which—

Figs. 1 and 2 are part-sectional front elevations of one embodiment of ring assembly apparatus as herein proposed, Fig. 1 illustrating the respective positions of the various operating plungers at the start of an operating cycle, and Fig. 2 illustrating the positions of the plungers upon ring assembly having been effected and before plunger retraction to their Fig. 1 position; and Figs. 3 and 4 are views similar to Figs. 1 and 2, respectively, but illustrating another embodiment of apparatus according to the invention.

Referring to Figs. 1 and 2, reference numeral 10 designates the base member of the apparatus which mounts a standard 11 supporting at or near its upper end an offset table 12 and an oppositely offset shelf 13, the latter mounting a horizontally disposed air cylinder 14 whose reciprocatory plunger 15 is drivingly connected to a slide 16 operating in a slideway 17 cut or otherwise provided in the upper face of said table 12. A cover plate 18 affixed to the aforesaid table 12 serves to close the slideway 17 from above, and shown to be integral with said cover plate is a vertically disposed tubular magazine 20 whose bore opens at its lower end with the slideway. The magazine 20 is adapted to maintain a supply of internal spring retaining rings R to be assembled in vertical stack or column relationship as seen in Fig. 1. The ring column is normally supported on the table 12, but it will be understood that upon the slide 16 partaking of its ring-feeding or working stroke (to the left), during the course of which it picks off or separates the lowermost ring R from the column thereof, the ring column rests on the moving slide. It will be understood also that the depth of the slideway 17, and also of the slide 16, is substantially that of the axial thickness of a ring R, so that the rings can only be actuated one at a time by the slide 16.

Connected to the magazine as by means of an offset bracket 20a so as to extend parallel with said magazine is a vertically disposed air cylinder 21 whose reciprocatory piston 22 drivingly connects to a plunger 23, the lower end of which projects through an opening provided therefor in the cover plate 18, which opening extends into the left end of the slideway 17. Normally, the plunger 23 is raised above the slideway at least the axial thickness of a ring R, so that a ring being moved along the latter by the slide 16 is free to move in under the plunger and against a stop shoulder 24, in which position it directly underlies said plunger.

Rigidly affixed to the table 12 and depending therefrom is a ring-contracting or compressing sleeve 26 arranged so that its through bore 27 is coaxial with the aforesaid plunger 23. Thus, when a ring R abuts the shoulder 24, it not only directly underlies the plunger 23, but also it directly overlies the sleeve bore 27, and hence it may move into said bore when so actuated by said plunger.

The aforesaid sleeve bore 27 has progressively decreasing diameter from its larger upper end, whose diameter preferably slightly exceeds the external diameter of the rings R in their unstressed state, to near its bottom end, as the latter is formed as an axially-short cylindrical portion 28 having diameter preferably slightly less than that of the bore of the housing in which a ring R is to be assembled, and terminating in an enlarged counter-bore 29 having diameter which preferably slightly exceeds the outer diameter of said housing. Thus, when a ring is pushed through the bore 27 by lowering movement of the plunger 23, it is progressively compressed to an outer diameter which is slightly less than the diameter of the bore of the housing in which it is to be assembled, and whose upper end may be received in said counter-bore 29.

Disposed beneath the aforesaid table 12 and coaxial with the air cylinder 21 is an oppositely disposed air cylinder 32 whose plunger 33 mounts at its upper end a work piece (housing) supporting and positioning fixture 34 having an upwardly facing central boss 35 of diameter which is preferably slightly less than that of the bore of the housing. As illustrated, the fixture 34 serves to support and center a housing 36 whose bore 37 is provided with a groove 38 into which a ring R is to be assembled, the ring thereupon forming an artificial shoulder for a machine part mounted in said bore. On the upward or working stroke of the plunger 33, the fixture also functions to move said housing upwardly to a position in which its upper end enters the lower end counter-bore 29 of the sleeve 26. Thus, a ring R being pushed through and finally from the sleeve enters the housing bore 37, with continuing lowering movement of the plunger pushing said ring to the plane of its groove 38 into which is springs upon reaching same.

The operation of the above described apparatus will be briefly explained. Normally, the plungers of all three air cylinders 14, 21 and 32 are in their retracted position, but they are actuable in the following predetermined succession: the air cylinder 14 operates first to cause the slide 16 to pick off the lowermost ring R from the column thereof and to move same to the left along the slideway 17 until said ring is stopped by its engagement with the limit shoulder 24, in which position it directly underlies the plunger 23. Air cylinder 21 is then operated, its plunger 23 thereupon forcing said ring axially into and through the bore 27 of the sleeve 26, as results in the ring being compressed to an outer diameter somewhat less than the diameter 37 of the housing bore 36. The air cylinder 32 is placed in operating during movement of the ring through the sleeve bore 27 and its fixture 34 effects raising movement of the housing 36 and entry of its upper end into the counter-bore 29 of the aforesaid sleeve 26 just prior to the compressed ring being pushed from the smaller-diameter cylindrical bore portion 28 of the sleeve bore. In such position, the housing is enabled to receive the ring, and the latter continues to move into the bore 37 until it reaches the groove 38, whereupon it springs into said groove.

Upon the plunger 15 of the air cylinder 14 and the slide 17 completing their ring-feeding stroke as described above, said plunger retracts to its normal or cycle-starting position as shown in Fig. 2 prior to or at about the instant that the plungers 23 and 33 reach the ends of their working strokes as aforesaid, as also shown in said view. Upon the ring having been successfully assembled, the plungers 23 and 33 proceed to retract to their normal or starting position whereupon the apparatus is conditioned for the next cycle of operation, such of course assuming that the housing 36 in which ring assembly has just been effected is replaced by a similar housing requiring another ring to be assembled in its bore.

According to the modified apparatus illustrated in Figs. 3 and 4, a mechanical linkage system operating responsively to movement of the ring compressing plunger 23a throughout its working stroke is substituted for the previously described air cylinder means for actuating the ring-feeding slide. That is to say, the slide 17a of the modified apparatus is operated by a linkage system including an arm 40 carried by a plunger 23a similar to the previously described plunger 23, the arm being offset from the plunger toward the ring magazine 20a. At its free end said arm 40 is connected to the upper end of a depending link 41, as by means of a pin and slot connection comprising pin or screw 42 and slot 43. At its lower end, the link 41 pivotally connects to one arm 45 of a bellcrank lever 46 pivoted intermediate its ends, as by a pin 47, to a fixed bracket 48 mounted on the cover plate 18a. The other arm 49 of the bell-crank extends in generally downward direction and its free end passes through an opening 50 provided in the rear (right) end of the slide 17a, being connected at its extreme lower end to one end of a coil spring 51 disposed below and affixed at its other end to the under side of the table 12a.

As seen in Fig. 3, the aforesaid spring 51 normally biases the bellcrank lever to the limit of its clockwise movement as results, assuming the plunger 23a to be raised, in the slide 17a being maintained in its leftmost position, in which its body portion extends beneath and accordingly supports the column of rings R contained within the ring magazine 20a, and its free end edge positions a ring directly beneath the plunger. However, upon said plunger 23a partaking of its working stroke, arm 40 also lowers, imparting counterclockwise movement to the bellcrank lever 46 as results in tensioning of the spring 51 and retracting movement of the slide 16a to its Fig. 4 position, in which it will be noted that its free end edge has moved past (to the right of) the column of rings R maintained in the magazine 20a. Accordingly on the next clockwise movement of the bellcrank lever 47, as occurs when plunger 23a partakes of its upper or return stroke, the slide 16a is actuated throughout its ring feeding (leftwise) stroke by the release of the previously tensioned spring 51, during which its free end edge engages the lowermost ring of the column thereof and moves same along the ring slide to a position directly beneath the now raised plunger 23a. Although not described in detail, it will be understood that the modified apparatus incorporates a ring contracting sleeve 26a and a housing supporting fixture 34a and its actuating air cylinder 32a identical with the corresponding parts of the first described (Figs. 1 and 2) form of apparatus.

According to a further feature of the invention, the plungers 23 and 23a, or at least the lower portion thereof, may be permanently magnetized for the purpose of increasing the efficiency of said plungers in centering the retaining rings with respect thereto. By this means, the retaining rings start their movement through the sleeve bores 27 and 27a in exact coaxial relationship therewith.

Without further analysis, it will be appreciated that the invention provides highly effective yet relatively simple apparatus for automatically assembling internal spring retaining rings in the grooves of housing bores and thus achieves the objective of such apparatus as explained in the foregoing. However, as many changes could be made in carrying out the above constructions without departing from the scope of the invention, it is intended that all matter contained in the above description or shown in the accompanying drawings shall be interpreted as illustrative and not in a limiting sense.

I claim:

1. Apparatus for assembling internal spring retaining rings in grooves provided therefor in the bores of housings and the like comprising, in combination, a generally horizontal supporting member, an upright ring magazine support on said member for maintaining a plurality of the retaining rings to be assembled in column formation, a sleeve member affixed to and depending from said supporting member with its axis generally parallel to that of said magazine and having a through bore of progressively decreasing diameter for compressing a ring received in the larger end thereof to the diameter of the housing bore responsively to axial movement of a ring through said sleeve bore, means mounted on said supporting member for picking off the endmost ring of the column thereof and for feeding it to the larger-diameter end of the sleeve bore, and reciprocating plunger means mounted coaxially with said sleeve for pushing said ring axially along the sleeve bore and thence into the bore of a housing positioned to receive the compressed ring until it reaches the plane of the housing groove into which it is to be assembled, the operation of said slide end plunger means being timed so that the slide means partakes of its ring-feeding stroke when the plunger means is retracted from the sleeve and retracts during the working stroke of the plunger means.

2. Apparatus for assembling internal spring retaining rings substantially as set forth in claim 1, combined with reciprocating plunger means for mounting the housing in which ring assembly is to be effected coaxial with and spaced from the sleeve and thereupon for moving said housing into engagement with the sleeve, wherein said last-named reciprocating plunger means operates in opposition to and in substantial synchronism with the first-named plunger means.

3. Apparatus for assembling internal spring retaining rings substantially as set forth in claim 1, wherein said reciprocating plunger means includes a plunger element adapted to enter said bore, at least the lower end portion of said plunger element being permanently magnetized so as to be effective in centering the ring fed to the larger-diameter end of the sleeve bore therewith.

4. Apparatus for assembling internal spring retaining rings in grooves provided therefor in the bores of housings and the like comprising, in combination, a generally horizontal supporting member, an upright tubular magazine supported on said member for maintaining a plurality of the retaining rings to be assembled in vertical column formation, a sleeve member having its axis parallel to that of the magazine and being affixed to and depending from said supporting member, a slideway in said supporting member extending between the magazine and sleeve, the bore of the sleeve having a diameter which progressively decreases from its upper end which has a diameter slightly larger than that of the rings to be assembled to its lower end which has a diameter slightly less than the bore of the housing in which a ring is to be assembled, reciprocating slide means in the slideway for feeding the lowermost ring of the column to the upper larger-diameter end of the sleeve bore, means for actuating said slide means, plunger means disposed generally above and coaxial with the sleeve and including a reciprocating plunger adapted on its working stroke to push a ring fed to the larger-diameter end of the sleeve bore through the same, means for actuating said plunger means, a mounting and centering fixture disposed generally below and coaxial with the sleeve, and means for actuating said fixture towards said sleeve thereby to engage the upper end of a housing mounted on said fixture with the lower end of the sleeve and with the housing bore in vertical alignment with the sleeve bore, the operation of said slide, plunger and fixture actuating means being timed so that the slide means feeds a ring to the upper end of the sleeve bore when the plunger and fixture actuating means are retracting, and retracts as said plunger and fixture-actuating means partake of their working stroke.

5. Apparatus for assembling internal spring retaining rings substantially as set forth in claim 4, wherein the means for actuating the slide means comprises a fluid motor.

6. Apparatus for assembling internal spring retaining rings substantially as set forth in claim 4, wherein the slide actuating means comprises a mechanical linkage system operative between said plunger means and said slide means.

References Cited in the file of this patent
UNITED STATES PATENTS

| | | |
|---|---|---|
| 1,437,431 | Lonbom | Dec. 5, 1922 |
| 2,264,738 | Blann | Dec. 2, 1941 |
| 2,357,139 | Seme | Aug. 29, 1944 |